United States Patent
Belghoul et al.

(10) Patent No.: US 8,964,822 B2
(45) Date of Patent: Feb. 24, 2015

(54) COMMUNICATION SYSTEM AND METHOD

(71) Applicant: NVIDIA Corporation, Santa Clara, CA (US)

(72) Inventors: Farouk Belghoul, Grasse (FR); Pete Cumming, Bristol (GB); Flavien Delorme, Sophia Antipolis (FR); Fabien Besson, Sophia Antipolis (FR); Bruno De Smet, Sophia Antipolis (FR); Callum Cormack, Cambridge (GB)

(73) Assignee: NVIDIA Corporation, Santa Clara, CA (US)

( * ) Notice: Subject to any disclaimer, the term of this patent is extended or adjusted under 35 U.S.C. 154(b) by 67 days.

(21) Appl. No.: 13/773,029

(22) Filed: Feb. 21, 2013

(65) Prior Publication Data
US 2014/0233616 A1    Aug. 21, 2014

(51) Int. Cl.
*H04B 1/38*    (2006.01)
*H04M 11/06*    (2006.01)

(52) U.S. Cl.
CPC .................................... *H04M 11/06* (2013.01)
USPC ........... 375/222; 375/219; 375/295; 375/316; 375/211

(58) Field of Classification Search
USPC ........................ 375/222, 219, 295, 316, 211
See application file for complete search history.

(56) References Cited

U.S. PATENT DOCUMENTS

| | | | | |
|---|---|---|---|---|
| 2008/0004052 A1* | 1/2008 | Bloebaum et al. | ............ | 455/466 |
| 2008/0291830 A1* | 11/2008 | Pernu et al. | .................. | 370/236 |
| 2009/0003319 A1* | 1/2009 | Sood et al. | ..................... | 370/352 |
| 2009/0022103 A1* | 1/2009 | Shatsky | ........................ | 370/331 |
| 2009/0104940 A1* | 4/2009 | Seshadri et al. | .............. | 455/563 |
| 2009/0109940 A1* | 4/2009 | Vedurmudi | .................... | 370/338 |
| 2009/0197640 A1* | 8/2009 | Fa et al. | ..................... | 455/556.1 |
| 2009/0325650 A1* | 12/2009 | Seshadri et al. | ........... | 455/569.1 |
| 2013/0148572 A1* | 6/2013 | Delorme et al. | ............. | 370/328 |

* cited by examiner

*Primary Examiner* — Kenneth Lam

(57) ABSTRACT

A modem is disclosed. An embodiment thereof includes: a first interface arranged to connect to a network, a second interface arranged to connect to a host processor on the terminal, an audio interface arranged to connect to an audio processing means and a processing unit arranged to receive a plurality of parameters from the terminal via the second interface. The plurality of parameters are associated with a call established by the host processor to at least one further terminal connected to the network; wherein the processing unit is further arranged to receive input voice data from the audio processing means, process the input voice data in dependence on at least one of said parameters; and transmit the processed input voice data via the first interface to the at least one further terminal over said network during the call in dependence on a further at least one of said parameters.

28 Claims, 4 Drawing Sheets

COMMUNICATION SYSTEM AND METHOD

TECHNICAL FIELD

The disclosure relates to a modem for use at a terminal. In particular the disclosure relates to the handling of data at the modem during a communication event with one or more further terminals.

BACKGROUND

FIG. 1a and FIG. 1b are schematic block diagrams of communication systems comprising a host terminal 2 and a modem 4. The host terminal 2 may be a user terminal, and may for example take the form of a desktop computer, laptop computer, tablet style computer, or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1a, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2). In another alternative set up, as shown in FIG. 1b, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection.

The system also comprises a network 6 such as a mobile cellular network 6 (3GPP network or other CDMA network). Elements of the network 6 are well known to those skilled in the art and are not discussed herein.

For connecting to the mobile cellular network 6, the modem 4 comprises a first interface.

With reference to the communication system shown in FIG. 1a, the first interface may comprise a wireless transceiver, typically in the form of a radio frequency (RF) transceiver and an antenna 5. The first interface of the modem 4 connects via an antenna (not shown) of the mobile cellular network 6 enabling the modem 4 to establish a channel between itself and the mobile cellular network 6.

With reference to the communication system shown in FIG. 1b, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via an antenna (not shown) of the mobile cellular network 6 enabling the modem 4 to establish a channel between itself and the mobile cellular network 6.

This channel referred to above may be referred to as a "context". For example, if the mobile cellular network is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP. The mobile cellular network 6 may be coupled to a further, packet-based network, preferably a wide area internetwork such as the Internet, by way of one or more gateway routers.

For connecting to the host processor 30 on the host terminal 2, the modem 4 comprises a second interface.

With reference to the communication system shown in FIG. 1a, the second interface, between the host processor 30 and modem 4, could for example comprise a wired connection such as USB, or a short-range wireless transceiver such as an infrared connection or a radio frequency connection (e.g. Bluetooth).

With reference to the communication system shown in FIG. 1b, the second interface, between the host processor 30 and modem 4, could for example comprise a wired connection within the host terminal 2.

FIG. 2 illustrates a known architecture for a user equipment (host terminal 2 and modem 4) to conduct a live voice and/or video call with one or more further terminals using a packet-based protocol such as internet protocol (IP). This type of communication is sometimes referred to as "voice over IP" (VoIP) or "video over IP".

The host terminal 2 comprises a host processor 30 and, operatively coupled to the processor 30, is a non-transitory computer-readable storage medium (not shown) such as a magnetic or electronic memory storing one or more application programs. The application programs comprise code arranged to be executed on the host processor 30. The application programs include a phone dialer program 202 comprising code which when executed on the host processor enable the host processor 30 to establish a call to at least one further terminal connected to the network 6. The application programs may also include other programs for example a browser program, email program, instant message program and file transfer program, shown collectively as block 206 in FIG. 2.

The host processor 30 also comprises an audio interface 214 connected to a speaker 216 for outputting audio data and a microphone 218 for receiving audio data. The audio interface 214 may comprise a wired or wireless connection to the speaker 216/microphone 218 as is well known in the art.

Once a call has been established by the phone dialer program 202, input voice data received by microphone 218 is transmitted, via the audio interface 214, to a voice codec 212 arranged to encode the input voice data into encoded audio data according to a suitable speech codec.

The host processor 30 processes the encoded audio data for communication to the network 6 according to Internet protocols.

A SIP/SDP stack 204 allows for SIP signalled communications to and from the network 6. SIP is an open signalling protocol for establishing many kinds of real-time communication sessions. Examples of the types of communication sessions that may be established using SIP include voice, video, and/or instant messaging.

Two protocols that are often used in conjunction with SIP are the Real Time Protocol (RTP) and the Session Description Protocol (SDP). The RTP protocol is used to carry the real-time multimedia data. SDP is used to describe and encode capabilities of session participants. Such a description is then used to negotiate the characteristics of the session so that all the devices can participate (that includes, for example, negotiation of codecs used to encode media so all the participants will be able to decode it, and negotiation of the transport protocol used).

In terms of the known TCP/IP protocol suite, SIP is an application layer protocol. Generally, there are two protocols available at the transport layer these are TCP (Transmission Control Protocol) and UDP (User Datagram Protocol). These protocols are represented by the UDP/TCP/IP stack 208. For call establishment TCP is commonly used, thus the SIP/SDP/TCP/IP protocols are configured to process data received from the phone dialer program 202 for communication to and from the network 6 according to Internet protocols to establish a call to at least one further terminal connected to the network 6.

Once the call is established, the host processor performs encapsulation of the encoded audio data. For example, the encoded audio data may be placed in packets according to the RTP standard represented by block 210. RTP is an application layer protocol in terms of the known TCP/IP protocol suite and data packets created at the application layer are known as messages. The application layer messages are encapsulated at the transport layer. For VOIP communications, UDP is commonly used. When UDP is used at the transport layer a data packet is known as a UDP datagram. The Internet Protocol (IP) at the Internet layer encapsulates the UDP datagram to form an IP datagram (otherwise referred to as an IP packet). Processing of the encoded audio data at the transport and internet layers is represented by block 208. All IP data (including IP voice data) is transmitted over the second interface to the modem 4.

The modem 4 comprises a modem processor 33, the modem processor 33 is arranged to receive the IP data from the host processor 30. The IP data is routed by data routing block 252. The data routing block 252 is responsible for routing of downlink data (received from the network 6) to the host processor 30 on the host terminal 2.

A 3GPP stack 254 is configured to process data for communication to and from a mobile cellular network 6 (3GPP network or other CDMA network), the 3GPP stack 254 comprising a set of protocol layers as defined for example by 3GPP for transferring data across a radio channel such as a 2G, 3G or LTE radio channel via the first interface.

When IP data is received from the network 6 via the first interface the IP data is routed from the modem 4 to the host processor 30. The host processor 30 performs data decapsulation represented by blocks 208 and 210 and the encoded audio data is supplied to voice codec 212. The voice codec 212 is arranged to decode the encoded audio data into decoded audio data, according to a suitable speech codec, for output via the speaker 216.

SUMMARY

According to one aspect of the disclosure there is provided a modem for use at a terminal. In one embodiment, the modem includes: (1) a first interface arranged to connect to a network, (2) a second interface arranged to connect to a host processor on the terminal, (3) an audio interface arranged to connect to an audio processing means and (4) a processing unit arranged to receive a plurality of parameters from the host processor via the second interface. The plurality of parameters are associated with a call established by the host processor to at least one further terminal connected to the network; wherein the processing unit is further arranged to receive input voice data from the audio processing means via the audio interface and process the input voice data in dependence on at least one of the parameters; wherein the processing unit is further arranged to transmit the processed input voice data via the first interface to the at least one further terminal over the network during the call in dependence on a further at least one of the parameters.

According to another aspect, the disclosure provides a computer program product for operating a modem for use at a terminal, the modem having a processing unit, a first interface arranged to connect to a network, a second interface arranged to connect to a host processor on the terminal, and an audio interface arranged to connect to an audio processing means. In one embodiment, the computer program product comprises code embodied on a non-transitory computer-readable medium and configured so as when executed on the processing unit of the modem to: (1) receive a plurality of parameters from the host processor via the second interface, the plurality of parameters associated with a call established by the host processor to at least one further terminal connected to the network, (2) receive input voice data from the audio processing means via the audio interface, (3) process the input voice data in dependence on at least one of the parameters and (4) transmit the processed input voice data via the first interface to the at least one further terminal over the network during the call in dependence on a further at least one of the parameters.

According to yet another aspect of the disclosure there is provided a method of operating a modem at a terminal, the modem having a processing unit, a first interface arranged to connect to a network, a second interface arranged to connect to a host processor on the terminal, and an audio interface arranged to connect to an audio processing means. In one embodiment, the method includes: (1) receiving a plurality of parameters from the host processor via the second interface, the plurality of parameters associated with a call established by the host processor to at least one further terminal connected to the network, (2) receiving input voice data from the audio processing means via the audio interface, (3) processing the input voice data in dependence on at least one of the parameters and (4) transmitting the processed input voice data via the first interface to the at least one further terminal over the network during the call in dependence on a further at least one of the parameters.

According to still another aspect of the disclosure there is provided a system. In one embodiment the system includes: (1) a terminal, (2) a network and (3) a modem for use at the terminal. The modem having: (3A) a first interface arranged to connect to the network, (3B) a second interface arranged to connect to a host processor on the terminal, (3C) an audio interface arranged to connect to an audio processing means and (3D) a processing unit arranged to receive a plurality of parameters from the host processor via the second interface. The plurality of parameters associated with a call are established by the host processor to at least one further terminal connected to the network; wherein the processing unit is further arranged to receive input voice data from the audio processing means via the audio interface and process the input voice data in dependence on at least one of the parameters; wherein the processing unit is further arranged to transmit the processed input voice data via the first interface to the at least one further terminal over the network during the call in dependence on a further at least one of the parameters.

BRIEF DESCRIPTION OF THE DRAWINGS

For a better understanding of the disclosure and to show how it may be put into effect, reference by way of example is made to the accompanying drawings in which.

DETAILED DESCRIPTION

Figure 1A:
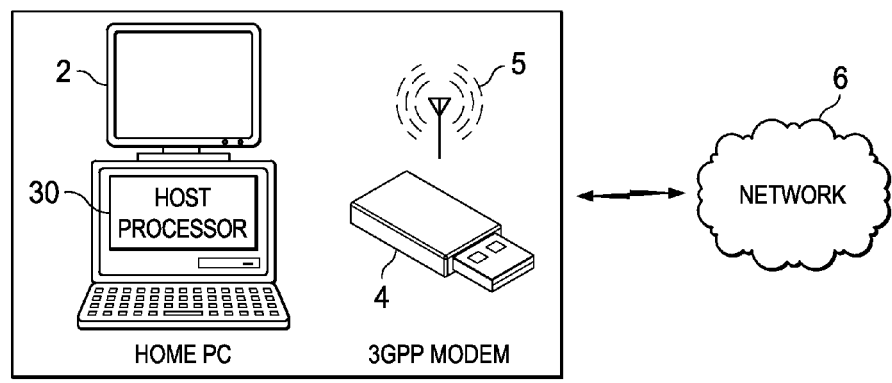
FIG. 1*a* and FIG. 1*b* are schematic block diagrams of communication systems comprising a host terminal and a modem.

For computer systems implemented on user devices, such as mobile smart phones and tablets, it is important to keep the power consumption of the computer system at a low level because, for example, the power supply to the user device may be limited. One mechanism to conserve power supply levels is for the processor on the host terminal to operate in a "sleep" mode. While in the low power (or sleep) mode the processor is unable to process information, but typically draws a fraction of the electrical current it draws while operating in an active (or awake) mode, where it does process information. Thus the processor consumes less power when in the sleep mode.

The disclosure recognizes that during a Voice over IP call, it would be advantageous for the host processor to go into sleep mode and for a screen on the host terminal to be switched off to conserve power. The disclosure has further recognised that this is not possible whilst using the known architecture for a user equipment shown in FIG. 2 due to the host processor having to handle the processing of the streaming audio data in a voice call.

Accordingly, the disclosure provides a modem, for use at a terminal, that in one embodiment includes: (1) a first interface arranged to connect to a network, (2) a second interface arranged to connect to a host processor on the terminal, (3) an audio interface arranged to connect to an audio processing means and (4) a processing unit arranged to receive a plurality of parameters from the host processor via the second interface. The plurality of parameters associated with a call are established by the host processor to at least one further terminal connected to the network; wherein the processing unit is further arranged to receive input voice data from the audio processing means via the audio interface and process the input voice data in dependence on at least one of the parameters; wherein the processing unit is further arranged to transmit the processed input voice data via the first interface to the at least one further terminal over the network during the call in dependence on a further at least one of the parameters.

The plurality of parameters may comprise a parameter indicating a type of audio codec to be used to encode audio data in the call, and the processing unit is arranged to encode the input voice data in dependence on the type of audio codec. The audio codec to be used to encode audio data in the call may be arranged to encode audio data at variable bit rates, the plurality of parameters may further comprise a parameter indicating the bit rates available to the audio codec to encode audio data and the processing unit is arranged to encode the input voice data at one of the available bit rates.

The processing unit may comprise a hardware codec module to encode the input voice data. Alternatively, the modem may comprise a memory coupled to the processing unit, the memory arranged to store code which when executed by the processing unit encodes the input voice data.

The plurality of parameters may comprise at least one destination Internet Protocol (IP) address associated with the at least one further terminal, and the processing unit may be arranged to transmit the processed input voice data via the first interface over the network to the at least one destination IP address during the call.

The plurality of parameters may further comprise at least one destination User Datagram Protocol (UDP) port number each corresponding to one of the at least one destination Internet Protocol (IP) addresses, and the processing unit may be arranged to transmit the processed input voice data via the first interface over the network to the UDP port number associated with the destination IP address during the call.

The processing unit may be further arranged to form the processed input voice data into IP packets in accordance with Internet Protocols for transmission to the at least one further terminal over the network.

The processing unit may be further arranged to form the processed input voice data into Internet Protocol (IP) packets in accordance with the Real Time Protocol (RTP), User Datagram Protocol (UDP) and Internet Protocol (IP) standards.

The plurality of parameters may comprise: a Synchronisation Source (SSRC) identifier, the SSRC identifier transmitted to the at least one further terminal in an RTP header of the IP packets. at least one source UDP port number associated with the terminal, the at least one source UDP port number transmitted to the at least one further terminal in a UDP header of the IP packets; and a source IP address associated with the terminal, the source IP address transmitted to the at least one further terminal in an IP header of the IP packets.

The processing unit may be arranged to receive the plurality of parameters from the host processor via the second interface in an Attention (AT) Command.

The processing unit may be arranged to receive data from the network via the first interface and the processing unit may be further arranged to route the received data to the host processor via the second interface or route the received data within the modem for further processing.

The processing unit may be arranged to route received audio data within the modem for further processing, and route all other data to the host processor via the second interface.

The processing unit may be arranged to receive audio data in the form of IP packets and the processing unit is arranged to route the received IP packets based on: i) a protocol transported by the received IP packets; ii) a UDP source port number transported in a UDP header of the received IP packets. Or iii) a 3rd Generation Partnership Project (3GPP) bearer on which the audio data was received at the modem.

The plurality of parameters may comprise a parameter indicating a type of audio codec to be used to decode the received audio data in the call, and the processing unit is arranged to decode the received voice data in dependence on the type of audio codec.

The processing unit may be arranged to transmit decoded voice data to the audio processing means via the audio interface.

The terminal may comprise a housing and the modem may be an internal module within the terminal housing. The second interface may comprise a wired connector or connection within the terminal housing to connect to the host processor. The first interface may connect to a first wireless transceiver of the terminal for connecting to the network.

The modem may comprise an external unit for use at the terminal. The second interface may be a Universal Serial Bus (USB) interface. The modem may comprise a dongle housing, the modem for plugging into the terminal via the second interface. The first interface may comprise a first wireless transceiver for connecting to the network. The second interface may comprise a second wireless transceiver for connecting to the terminal via a local wireless connection. The modem may comprise a mobile phone housing for connecting to the terminal via the second interface, the mobile phone thus being operable as a telephone and as an external wireless cellular modem for the terminal.

Embodiments disclosed herein are described in more detail with reference to FIGS. 3 to 5.

Figure 3:
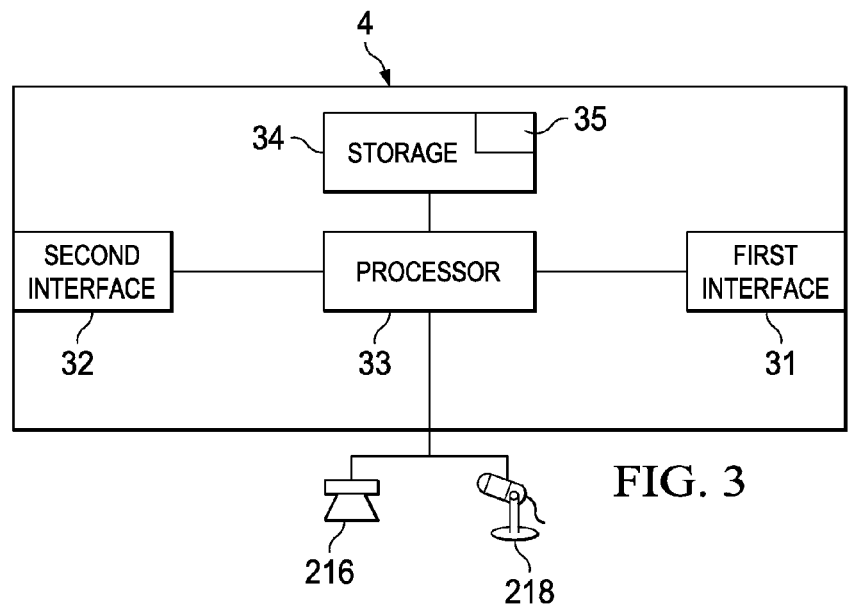
FIG. 3 is a schematic block diagram of a modem for use at a host terminal.

Referring to FIG. 3, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and network 6, and to perform the additional operations of the modem 4 as discussed below. However, the possibility of some or all of the modem functionality being implemented in dedicated hardware is not excluded.

Figure 1B:
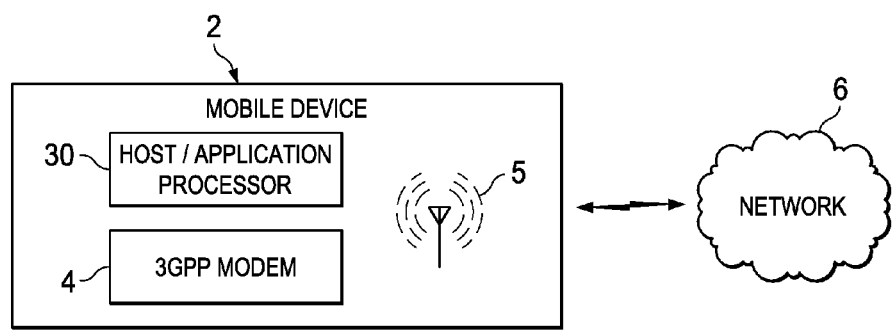

The modem 4 comprises a first interface 31 corresponding to the first interface referred to above with reference to FIG. 1. The modem 4 also comprises a second interface 32 corresponding to the second interface referred to above with reference to FIG. 1. The modem may be configured in a similar manner to that discussed in relation to FIG. 1 above, but with additional functionality added in accordance with the principles of the disclosure, an example of which will be discussed in more detail below.

As shown in FIG. 3 the modem 4 has direct access to interface with a speaker 216 for outputting audio data and a microphone 218 for receiving audio data. This is described in more detail with reference to FIGS. 4 and 5.

Figure 4:
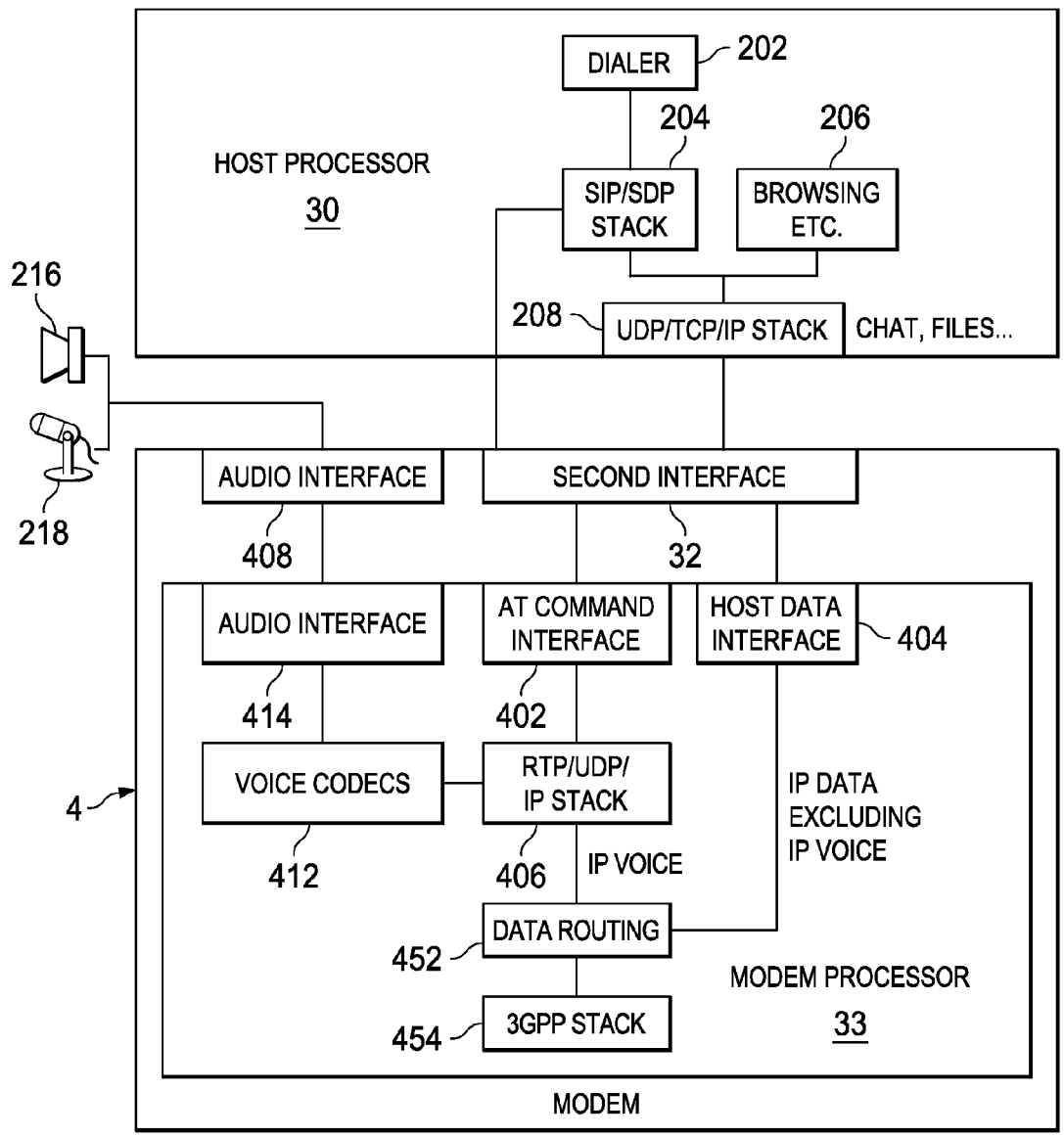
FIG. 4 is a schematic block diagram of a modem processor and a processor at a host terminal.

FIG. 4 illustrates a host processor 30 and the modem 4 according to embodiments of the disclosure.

As in the known architecture for a user equipment (host terminal 2 and modem 4) the host processor 30 is operatively coupled to a non-transitory computer-readable storage medium (not shown) such as a magnetic or electronic memory storing one or more application programs. The application programs comprise code arranged to be executed on the host processor 30. The application programs include the phone dialer program 202 (referred to above with reference to FIG. 2) comprising code which when executed on the host processor 30 enables the host processor 30 to establish a call to at least one further terminal connected to the network 6. The application programs may also include other programs for example the browser program, email program, instant message program and file transfer program (referred to above with reference to FIG. 2) shown collectively as block 206. As in the architecture of FIG. 2 the host processor 30 comprises a SIP/SDP stack 204, and UDP/TCP/IP stack 208 configured to process data received from the phone dialer program 202 for communication to and from the network 6 according to Internet protocols to establish a call to at least one further terminal connected to the network 6.

Figure 2:
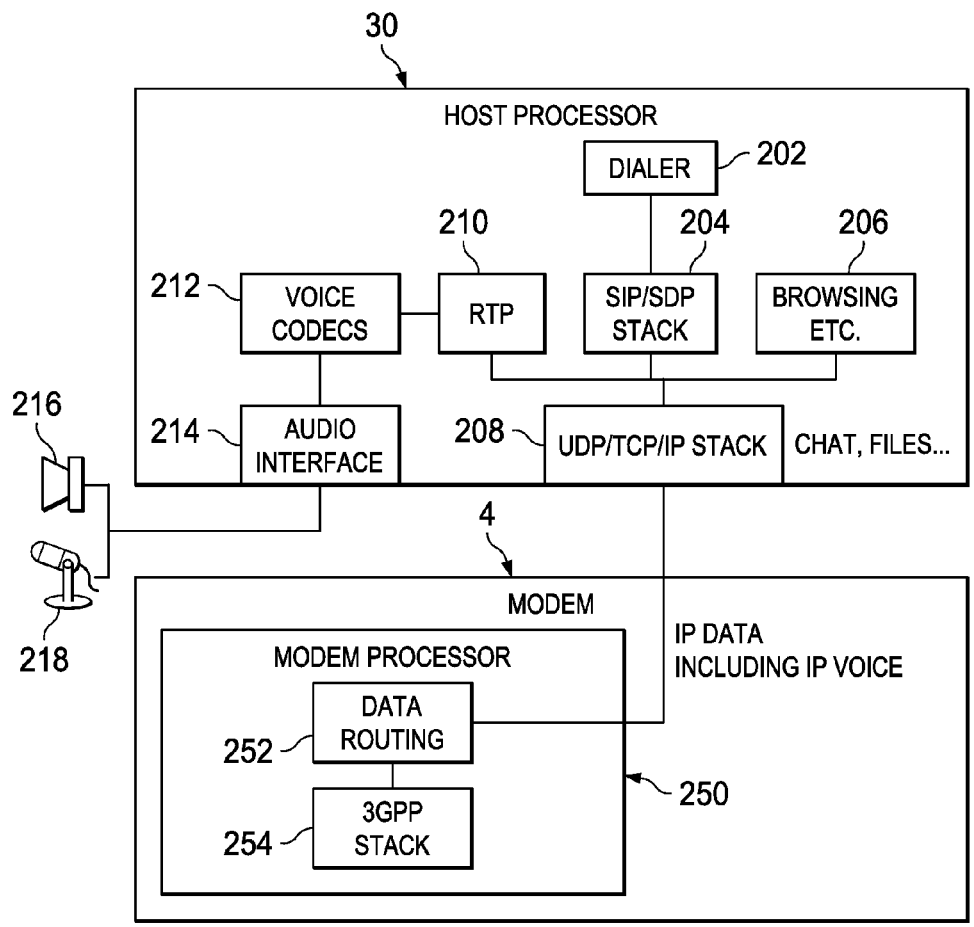
FIG. 2 illustrates a known architecture for a user equipment.

In contrast to the architecture shown in FIG. 2, in embodiments provided herein the voice streaming functionality is no longer implemented at the host processor 30. In the disclosed embodiments, the voice streaming functionality is implemented at the modem 4 as will be described in more detail below.

At the host processor 30, the SIP/SDP/TCP/IP protocols are configured to process data received from the phone dialer program 202 for communication to and from the network 6 according to Internet protocols to establish a call to at least one further terminal connected to the network 6. SIP leverages SDP to establish streaming parameters for the session so that all the devices can participate (that includes, for example, negotiation of codecs used to encode media so all the participants will be able to decode it, and negotiation of the transport protocol used).

Once call establishment is complete, streaming parameters from the SIP/SDP negotiation are supplied from the host processor 30 via the second interface 32 to the modem 4. The streaming parameters may be supplied to the modem 4 in the form of an AT (ATtention) command. The modem processor 33 includes an AT command interface 402 for receiving AT commands from the host processor 30 on the host terminal 2. The AT command interface 402 may take the form of an application program interface (API). The AT commands received over the AT command interface 402 are used to control the operation for the modem 4 as described in more detail below.

The parameters provided to the modem 4 resulting from SIP/SDP negotiation include a source IP (IPv4 or IPv6) address (of the host terminal 2) and one or more destination IP (IPv4 or IPv6) addresses (of the further terminal(s) to which the call has been established). Both the source and destination IP address are included in the IP header of the IP packets transmitted to the network 6 following processing at block 408. The destination IP address identifies the further terminal connected to the network 6 to which the packet should be sent. The source IP address identifies the host terminal 2 to the further terminal so that the further terminal can transmit data to the host terminal across the network 6.

The parameters provided to the modem 4 resulting from SIP/SDP negotiation further include a UDP source port (identifies the higher layer process which originated the data) and a UDP destination port (identifies the higher layer process to which this data is being transmitted). Both the source and destination UDP port numbers are included in the UDP header of the IP packets transmitted to the network 6 following processing at block 408. The UDP destination port number allows the IP packet, once routed to a specific destination IP address to be further routed to a specific process bound to the destination port number. Similarly, the UDP source port number identifies the UDP source port used by the user equipment for the communication to the further terminal.

The pairing of an IP address and a port as a connection endpoint is known as a "socket". There may be two different sockets: one for the audio stream and one for the video stream. In this scenario, as source and destination ports are unique for a given socket, the video and the audio streams will have different source and destination ports. Thus the UDP source port provided to a further terminal will be different for audio data (handled by modem 4) and video data (handled by host processor 30) and this information is used by a further terminal as a destination UDP port when transmitting audio/video data to the user equipment and data received over the network 6 can be routed in the modem 4 based on this UDP destination port Alternatively a single socket may be used for both audio and video data. In this scenario, audio and video streams received over the network 6 are differentiated by the payload type field within the RTP header of received packets.

The parameters provided to the modem 4 resulting from SIP/SDP negotiation further include a RTP Synchronisation Source (SSRC) identifier (a randomly chosen number which identifies the source of the data stream). The SSRC identifier may be used by the data routing block 452 to route downlink data packets received from the network 6 in addition to source/destination IP addresses and source/destination ports. For uplink transmissions to the network 6, the SSRC identifier is an input for a RTP/UDP/IP stack 406 to build the RTP header. That is, the SSRC identifier is included in the RTP header of an IP packet transmitted to the network 6 following processing at block 406.

The parameters provided to the modem 4 resulting from SIP/SDP negotiation further include codec configuration information. The codec configuration information may include the codec type (for example whether the codec is an Adaptive Multi Rate (AMR) codec or an Adaptive Multi Rate Wideband (AMR-WB) codec. The codec configuration information may further include a list of bit rates available to the codec to encode/decode data.

Two parameters are already available to the modem 4 following primary PDP context (or default Bearer Context in LTE) activation. These parameters include an IPv4 or IPv6 Proxy Call Session Control Function (PCSCF) destination address (for uplink SIP signalling traffic) and an IPv4 or IPv6 source address.

With regards to an IPv4 source address, an IPv4 source address is allocated by the network 6 when the primary PDP context or the default EPS bearer (in LTE) is activated. The IPv4 source address supplied from the host processor 30 to the modem 4 via the AT command interface 402 should be the same. However the modem 4 cannot prevent the host processor 30 selecting to use an alternative IPv4 source address. With regards to an IPv6 source address, the network 6 allocates an 8 bytes long identifier that the host will use to build an IPv6 address. The host processor 30 initiates relevant IPv6 procedures (exchanges of ICMPv6 messages with an IPv6 router located in network 6) to build this IPv6 address. The modem 4 may know the IPv6 source address by looking at the ICMPv6 messages exchanged with the IPv6 router in the network 6. In both cases (IPv4 and IPv6), the modem 4 should rely on the IP source address supplied via the AT command interface 402 because the AT command interface 402 is the most reliable way to get the correct IP source address.

Once the modem 4 has received the parameters over the AT command interface 402, the modem 4 shall be able to establish and maintain a streaming flow with a reduced RTP/UDP/IP support or any streaming protocol. That is, the modem 4 performs encapsulation (uplink) and decapsulation (downlink) of RTP/UDP/IP headers (performed by embedded RTP/UDP/IP stack 406) and routing of data packets (performed by data routing block 452) as described in more detail below.

The modem 4 comprises an audio interface 408. The audio interface 408 is arranged to couple the modem 4 to a speaker 216 and a microphone 218. Once a call has been established by the phone dialer program 202, input voice data received by microphone 218 is transmitted, via the audio interface 408, to the modem processor 33. The modem processor 33 comprises an audio interface 414 for receiving the input voice data.

A voice codec 412 is arranged to encode the input voice data into encoded audio data according to a suitable speech codec. The voice codec is arranged to encode/decode data according to a parameter (indicating codec type) received from the host processor 30. For example the voice codec 412 may comprise for example an Adaptive Multi Rate (AMR) codec and an Adaptive Multi Rate Wideband (AMR-WB) codec and a parameter received from the host processor 30 may indicate which of these codecs to use. Wherein the voice codec 412 is arranged to encode the input voice data at variable bit rates, the voice codec 412 is arranged to encode the input voice data at a bit rate according to a parameter (indicating list of available bit rates) received from the host processor 30.

The voice codec 412 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to perform encoding and decoding operations. However, the possibility of some or all of the functionality of the code 35 being implemented in dedicated hardware is not excluded.

The processor 33 processes the encoded audio data for communication to the network 6 according to Internet protocols. In particular, the processor 33 performs encapsulation of the encoded audio data according to RTP, UDP, and IP represented by block 406 described above with reference to blocks 210 and 208 shown in FIG. 2.

The RTP, UDP, and IP processing 406 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as to process the encoded audio data for communication to and from the network 6 according to Internet protocols. However, the possibility of some or all of the functionality of the code 35 being implemented in dedicated hardware is not excluded.

The modem processor 33 may receive instructions to start and stop streaming the encoded audio data for communication to and from the network 6 from the host processor 30, thus controlling the RTP, UDP, and IP processing 406 executed on the modem processor 33. These instructions may be received via the AT command interface 402 in the form of an AT command.

The 3GPP stack 454 is configured to process the encoded audio data for communication to and from a mobile cellular network 6 (3GPP network or other CDMA network), the 3GPP stack 454 comprising a set of protocol layers as defined for example by 3GPP for transferring data across a radio channel such as a 2G, 3G or LTE radio channel. As is well known, the protocol stack according to 3GPP comprises a plurality of layers, beginning at the lowest layer is the physical layer PHY which represents the signalling link, then a medium access control (MAC) protocol layer, then a radio link control (RLC) protocol layer and then a packet data convergence protocol (PDCP) layer. The 3GPP protocol stack 454 also includes a number of other higher layers, not discussed herein. The 3GPP protocol stack 454 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to perform the operations described above.

The encoded audio data is transmitted to the network via the first interface 31 as part of the call to the at least one further terminal connected to the network 6.

The modem processor 33 is arranged to transmit the encoded audio data to a destination IP address indicated in a parameter received from the host processor 30. The modem processor 33 is further arranged to transmit the encoded audio data to a destination UDP port associated with the destination IP address, the destination UDP port indicated in a parameter received from the host processor 30.

The modem processor 33 is further arranged to transmit SIP signalling data received from the host processor 30 via the host data interface 404 to the PCSCF destination address. The SIP signalling data includes packets exchanged between the host processor 2 of the host terminal 2 and a PCSCF server (in network 6) in order to establish, monitor and release a SIP session. The host data interface 404 is used by the modem 4 and the host to exchange uplink and downlink SIP signalling packets.

In the call, encoded data transmitted from at least one further terminal connected to the network 6 may be received at the first interface 31 of the modem 4. This downlink data is processed by the 3GPP stack 412 and is routed accordingly.

Routing of data to and from network 6 is represented by block 452. The data routing 452 is implemented in the form of code 35 stored on the non-transitory computer-readable medium 34 of the modem 4 (not necessarily the same physical memory device as the rest of the soft modem code, though it could be) and arranged for execution on the processor 33 of the modem 4 so as when executed to perform data routing operations. However, the possibility of some or all of the functionality of the code 35 being implemented in dedicated hardware is not excluded. In particular data routing block 452 routes downlink data packets (i.e. packets received by the modem 4 from the network 6) to the right interface. The 3GPP stack 454 may have interfaces with the embedded IP stack 406 or host processor 30. The embedded IP stack 406 may offer IP connectivity for an embedded audio module (voice codecs+RTP/UDP processing) or embedded applications like BIP or SUPL. The interfaces with the host processor 30 may be in accordance with, for example, the Network Driver Interface Specification (NDIS) or Point to Point Protocol (PPP) over the second interface 32 which may be a USB, WI-FI or Bluetooth interface when the modem is implemented in accordance with FIG. 1a or a wired interface when the modem is implemented in accordance with FIG. 1b.

In disclosed embodiments, given the parameters provided by the host processor 30 via the AT command interface 402, downlink data packets of an audio stream received over the network 6 ("IP voice") is routed to the embedded RTP/UDP/IP stack 406 rather than the host processor 30.

Figure 5:
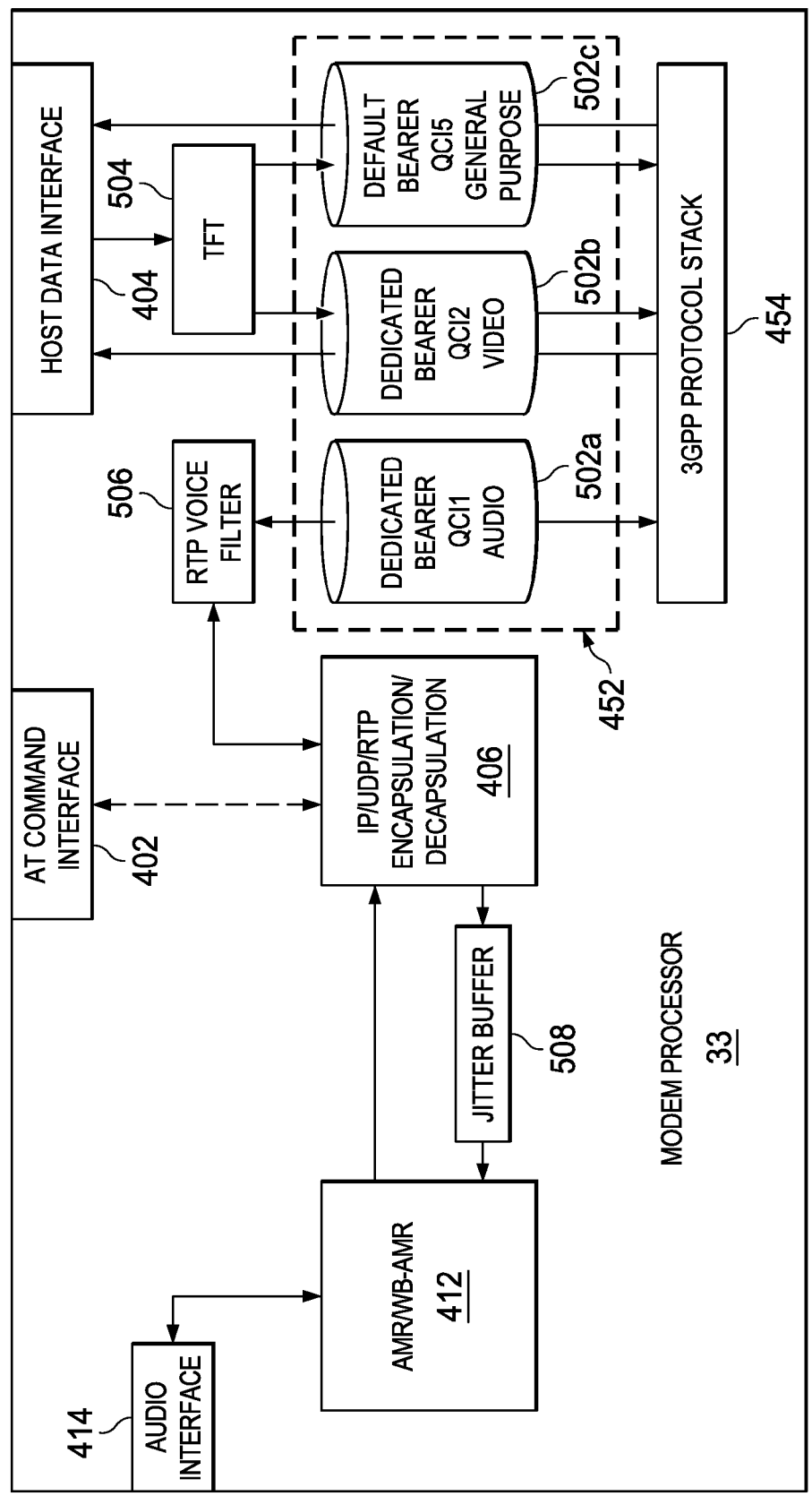
FIG. 5 is a schematic block diagram of a modem processor.

Routing of the downlink data may be based on:
i) the protocol transported by IP packets—for example the routing of the downlink data may be based on an RTP header included in the IP packets identifying the format of the RTP payload (voice and/or video data);
ii) the UDP source port (provided by the SIP/SDP stack 204 from the SIP/SDP negotiation);
or
iii) directly based on the 3GPP bearer if a bearer dedicated to the streaming has been established by the network when the call started (this is described in more detail with reference to FIG. 5).

The processor 33 processes the downlink encoded audio data according to Internet protocols. In particular, the processor 33 performs decapsulation of the encoded audio data according to RTP, UDP, and IP represented by block 406 described above with reference to blocks 210 and 208 shown in FIG. 2.

The encoded audio data is supplied to voice codec 212. The voice codec 212 is arranged to decode the encoded audio data into decoded audio data, according to a suitable speech codec. The decoded audio data is output from the audio interface 414 of the modem processor 33 and transmitted to the speaker 216, via the audio interface 408.

Any IP data other than IP voice data is routed by data routing block 452 to a host data interface 404 of the processor 33 where it is then transmitted to the host processor 30 via the second interface 32.

Thus once the host processor 30 has established a call and transmitted the streaming parameters to the modem processor 33 and streaming of the audio data has started, the host processor 30 can enter a sleep mode because the host processor 30 does not handle the processing of the streaming audio data. In some embodiments it is the modem 4 that handles the processing of the streaming audio data.

Thus, embodiments provided herein advantageously reduce power consumption of the host processor 30 on the host terminal 2 and increase the talk time available to the user of the host terminal 2.

Whilst disclosed embodiments have been described above with reference to a voice call, the method also applies to a video call. That is, encoded video data received at the modem 4 from the network 6 will be routed to the host processor 30, whilst encoded audio data received at the modem 4 from the network 6 during the video call is processed by the modem 4.

FIG. 5 illustrates the modem processor 33 in more detail. In particular the data routing block 452 is shown in more detail when the modem processor 33 is arranged to transfer data across an LTE radio channel.

In LTE a "bearer" is an edge-to-edge association between a user equipment and a gateway of the 3GPP network. A bearer may provide a guaranteed bit rate (GBR) or a non-guaranteed bit rate (non-GBR). A bearer may also be classed as a "default" bearer or a "dedicated" bearer. Default bearers are established when a host terminal is initially attached to a network. One default bearer exists per IP address to provide basic connectivity without providing a specific level of quality of service (QoS). In LTE, it is mandatory that a default bearer be a non-GBR bearer. Dedicated bearers are normally established during the call set up process and provide a specific level of quality of service (QoS). A bearer may be defined through a QoS Class Identifier (QCI). A set of QCI's have been standardised for LTE. A CQI value identifies a resource type (GBR or non-GBR), and an associated priority level, packet delay budget and packet error loss rate of the bearer.

As shown in FIG. 5, encoded audio data may be received from the network 6 on a dedicated bearer 502a associated with a QCI value of QCI=1. This QCI identifier identifies that the bearer 502a provides a GBR service and that the bearer is used for audio data. The data routing block 452 routes the data received on bearer 502b based on the QCI value (QCI=1) i.e. based on the fact that the bearer is used for audio data. Encoded audio data received on dedicated bearer 502a is routed by the data routing block 452 such that the encoded audio data is processed at the modem 4 before being supplied to the audio interface 414 for output by speaker 218.

The encoded audio data received on dedicated bearer 502a from the network 6 is routed by the data routing block 452 to processing block 406 via an RTP voice filter 506. The encoded audio data received on dedicated bearer 502a is processed according to IP, UDP, and RTP protocols 406 and decoded by the voice codec 212 into decoded audio data. Prior to decoding, once the encoded audio is processed according to IP, UDP, and RTP protocols 406 the encoded data may be supplied to a jitter buffer 508.

The encoded audio data may have been detrimentally delayed or corrupted as it was transmitted over the LTE radio channel. The jitter buffer 508 may be used at the modem 4 in order to smooth out the effects of variations in the delay of transmission of data and packet loss in a real-time communication event. This increases the possibility of achieving continuous playback of the audio data at the modem 4 despite random variations in packet propagation delay (known as jitter). The jitter buffer 508 is used to accumulate a few data packets before supplying the encoded audio data to the voice codec 412, thus introducing an extra delay (jitter buffer delay) into the communication event that helps to accommodate the data packet propagation delay jitter. Whilst the jitter buffer 508 has been described with reference to FIG. 5, the use of a jitter buffer 508 is not limited to when the modem processor 33 is arranged to transfer data across an LTE radio channel.

Encoded video data may be received from the network 6 on a dedicated bearer 502b associated with a QCI value of QCI=2. This identifier identifies that the bearer 502a provides a GBR service and that the bearer is used for video data. The data routing block 452 routes the data received on bearer 502b based on the QCI value (QCI=2) i.e. based on the fact that the bearer is used for video data. Encoded video data received on dedicated bearer 502a is routed by the data routing block 452 such that the encoded video data is routed to the host data interface 404 of the modem processor 33 where it is supplied to the host processor 30 via the second interface 32.

Other IP data such as SIP signalling information (for registration and session control) may be received from the network 6 on a default bearer 502c associated with a QCI value of QCI=5. This identifier identifies that the bearer 502c provides a non-GBR service and that the bearer is used for signalling information. The data routing block 452 routes the data received on bearer 502c based on the QCI value (QCI=5) i.e. based on the fact that the bearer is used for signalling information. Signalling information received on default bearer 502c is routed by the data routing block 452 such that the signalling information is routed to the host data interface 404 of the modem processor 33 where it is supplied to the host processor 30 via the second interface 32.

Thus it will be apparent from the above that routing of downlink data to the network may be based directly on the 3GPP bearer dedicated to the streaming that has been established by the network 6 when the call was started.

Encoded audio data for transmission to the network 6 is routed on dedicated bearer 502a by data routing block 452. Encoded video data for transmission to the network 6 from the host processor 30 is routed on dedicated bearer 502b by data routing block 452. Signalling information for transmission to the network 6 from the host processor 30 is routed on dedicated bearer 502c by data routing block 452. A traffic flow template (TFT) 504 provided by the network 6 specifies the routing of the uplink packets from the host processor 30. The TFT 504 defines several sets of criterions (filters) for example source and destination IP addresses and source and destination port numbers, that the modem 4 uses, and in some embodiments must use, to route the uplink packets to the right PDP context (or EPS bearer in LTE). The RTP voice filter 506 routes uplink RTP audio packets to the correct secondary PDP context (or dedicated EPS bearer in LTE). The RTP voice filter 506 may operate by examining the uplink packet header and verifying that it is an RTP/UDP/IP header with a payload type describing an audio stream. Whilst the RTP voice filter 506 has been described with reference to FIG. 5, the use of RTP voice filter 506 is not limited to when the modem processor 33 is arranged to transfer data across an LTE radio channel.

It will be appreciated that the above embodiments have been described only by way of example, and other variants or applications may be apparent to a person skilled in the art given the disclosure herein.

For instance, while embodiments above have been described in relation to certain standards such as 3GPP networks, Internet Protocol, Session Initiation Protocol, and so forth, these are not intended to be limiting and the disclosed embodiments may in fact be applied within any communication standard of any mobile cellular network, or of any packet-based network if such a network is involved. Nor do the terms "context" or "channel" imply a specific nature or standard, but can be used to refer to any kind of suitable data conduit or session established between a modem and a network The portions of code 35 referred to above to implement the voice codecs 412, the RTP/UDP/IP processing 406, the data routing block 452, and the 3GPP stack 454 may be portions of the same code stored in the same physical memory device. Alternatively the code 35 referred to above to implement the voice codecs 412, the RTP/UDP/IP processing 406, and the 3GPP stack 454 may be separate portions of code stored in respective physical memory devices.

This disclosure is not limited by the described examples but only by the appended claims.

The invention claimed is:

1. A modem for use at a terminal, the modem comprising:
a first interface arranged to connect to a network;
a second interface arranged to connect to a host processor on the terminal;
an audio interface arranged to connect to an audio processing means; and
a processing unit arranged to receive a plurality of parameters from the host processor via the second interface, the plurality of parameters associated with a call established by the host processor to at least one further terminal connected to the network;
wherein the processing unit is further arranged to receive input voice data from the audio processing means via the audio interface and process the input voice data in dependence on at least one of said parameters;
wherein the processing unit is further arranged to transmit the processed input voice data via the first interface to the at least one further terminal over said network during the call in dependence on a further at least one of said parameters,
and wherein the modem receives the input voice data directly from the audio processing means, and wherein the host processor does not directly receive the input voice data from the audio processing means.

2. The modem of claim 1, wherein the plurality of parameters comprise a parameter indicating a type of audio codec to be used to encode audio data in the call, and the processing unit is arranged to encode the input voice data in dependence on the type of audio codec.

3. The modem of claim 2, wherein the audio codec to be used to encode audio data in the call is arranged to encode audio data at variable bit rates, the plurality of parameters further comprise a parameter indicating the bit rates available to the audio codec to encode audio data and the processing unit is arranged to encode the input voice data at one of the available bit rates.

4. The modem of claim 2, wherein the processing unit comprises a hardware codec module to encode the input voice data.

5. The modem of claim 2, wherein the modem further comprises a memory coupled to said processing unit, the memory arranged to store code which when executed by the processing unit encodes the input voice data.

6. The modem of claim 1, wherein the plurality of parameters comprise at least one destination Internet Protocol (IP) address associated with the at least one further terminal, and the processing unit is arranged to transmit the processed input voice data via the first interface over said network to the at least one destination IP address during the call.

7. The modem of claim 6, wherein the plurality of parameters further comprise at least one destination User Datagram Protocol (UDP) port number each corresponding to one of the at least one destination Internet Protocol (IP) addresses, and the processing unit is arranged to transmit the processed input voice data via the first interface over said network to the UDP port number associated with the destination IP address during the call.

8. The modem of claim 1, wherein the processing unit is further arranged to form the processed input voice data into IP packets in accordance with Internet Protocols for transmission to the at least one further terminal over said network.

9. The modem of claim 8, wherein the processing unit is further arranged to form the processed input voice data into Internet Protocol (IP) packets in accordance with the Real Time Protocol (RTP), User Datagram Protocol (UDP) and Internet Protocol (IP) standards.

10. The modem of claim 9, wherein the plurality of parameters comprise:
 a Synchronisation Source (SSRC) identifier, the SSRC identifier transmitted to the at least one further terminal in an RTP header of the IP packets; and
 at least one source UDP port number associated with said terminal, the at least one source UDP port number transmitted to the at least one further terminal in a UDP header of the IP packets;
 and a source IP address associated with said terminal, the source IP address transmitted to the at least one further terminal in an IP header of the IP packets.

11. The modem of claim 1, wherein the processing unit is arranged to receive the plurality of parameters from the host processor via the second interface in an Attention (AT) Command.

12. The modem of claim 1, wherein the processing unit is arranged to receive data from the network via the first interface and the processing unit is further arranged to route the received data to the host processor via the second interface or route the received data within the modem for further processing.

13. The modem of claim 12, wherein the processing unit is arranged to route received audio data within the modem for further processing, and route all other data to the host processor via the second interface.

14. The modem of claim 13, wherein the plurality of parameters comprise a parameter indicating a type of audio codec to be used to decode the received audio data in the call, and the processing unit is arranged to decode the received voice data in dependence on the type of audio codec.

15. The modem of claim 14, wherein the processing unit is arranged to transmit decoded voice data to the audio processing means via the audio interface.

16. The modem of claim 12, wherein the processing unit is arranged to receive audio data in the form of IP packets and the processing unit is arranged to route the received IP packets based on:
 i) a protocol transported by the received IP packets;
 ii) a UDP source port number transported in a UDP header of the received IP packets, or
 iii) a 3rd Generation Partnership Project (3GPP) bearer on which the audio data was received at the modem.

17. The modem of claim 1, wherein the terminal comprises a housing and the modem is an internal module within said terminal housing.

18. The modem of claim 17, wherein the second interface comprises a wired connector or connection within said terminal housing to connect to the host processor.

19. The modem of claim 17, wherein the first interface connects to a first wireless transceiver of said terminal for connecting to the network.

20. The modem of claim 1, wherein the modem comprises an external unit for use at the terminal.

21. The modem of claim 20, wherein the second interface is a Universal Serial Bus (USB) interface.

22. The modem of claim 20, wherein the modem comprises a dongle housing, said modem for plugging into said terminal via the second interface.

23. The modem of claim 20, wherein the first interface comprises a first wireless transceiver for connecting to the network.

24. The modem of claim 20, wherein the second interface comprises a second wireless transceiver for connecting to the terminal via a local wireless connection.

25. The modem of claim 1, wherein the modem comprises a mobile phone housing for connecting to said terminal via the second interface, the mobile phone thus being operable as a telephone and as an external wireless cellular modem for the terminal.

26. A computer program product for operating a modem for use at a terminal, the modem having a processing unit, a first interface arranged to connect to a network, a second interface arranged to connect to a host processor on the terminal, and an audio interface arranged to connect to an audio processing means;
 wherein the computer program product comprises code embodied on a non-transitory computer-readable medium and configured so as when executed on the processing unit of said modem to:
 receive a plurality of parameters from the host processor via the second interface, the plurality of parameters associated with a call established by the host processor to at least one further terminal connected to the network;
 receive input voice data from the audio processing means via the audio interface;
 process the input voice data in dependence on at least one of said parameters; and
 transmit the processed input voice data via the first interface to the at least one further terminal over said network during the call in dependence on a further at least one of said parameters,
 wherein the modem receives the input voice data directly from the audio processing means, and wherein the host processor does not directly receive the input voice data from the audio processing means.

27. A method of operating a modem at a terminal, the modem having a processing unit, a first interface arranged to connect to a network, a second interface arranged to connect to a host processor on the terminal, and an audio interface arranged to connect to an audio processing means, wherein the method comprises:
 receiving a plurality of parameters from the host processor via the second interface, the plurality of parameters associated with a call established by the host processor to at least one further terminal connected to the network;
 receiving input voice data from the audio processing means via the audio interface;
 processing the input voice data in dependence on at least one of said parameters; and
 transmitting the processed input voice data via the first interface to the at least one further terminal over said network during the call in dependence on a further at least one of said parameters,
 wherein the modem receives the input voice data directly from the audio processing means, and wherein the host processor does not directly receive the input voice data from the audio processing means.

28. A system comprising:
 a terminal;
 a network; and a modem for use at the terminal, the modem comprising:
  a first interface arranged to connect to the network;
  a second interface arranged to connect to a host processor on the terminal;
  an audio interface arranged to connect to an audio processing means; and
  a processing unit arranged to receive a plurality of parameters from the host processor via the second interface, the plurality of parameters associated with a call established by the host processor to at least one further terminal connected to the network;
  wherein the processing unit is further arranged to receive input voice data from the audio processing means via the audio interface and process the input voice data in dependence on at least one of said parameters;
  wherein the processing unit is further arranged to transmit the processed input voice data via the first interface to the at least one further terminal over said network during the call in dependence on a further at least one of said parameters,
and wherein the modem receives the input voice data directly from the audio processing means, and wherein the host processor does not directly receive the input voice data from the audio processing means.

* * * * *